United States Patent [19]

Pinto et al.

[11] Patent Number: 4,681,646

[45] Date of Patent: Jul. 21, 1987

[54] METHOD FOR SPLICING OF ELASTOMERIC BELTS

[75] Inventors: Gideon Pinto, Carmiel; Jonathan Schanin, Haifa, both of Israel

[73] Assignee: Volta Power Belting, Ltd., B'Nai Brak, Israel

[21] Appl. No.: 743,612

[22] Filed: Jun. 11, 1985

[30] Foreign Application Priority Data

Jul. 30, 1984 [IL]  Israel .......................................... 72538

[51] Int. Cl.⁴ .......................................... B65H 69/06
[52] U.S. Cl. .................................. 156/157; 156/137; 156/294; 156/303.1; 156/304.1; 156/304.2; 156/304.5; 474/254; 474/256; 264/36
[58] Field of Search ....................... 156/73.2, 137–138, 156/139, 142, 157, 158, 168, 293–294, 296, 303.1, 304.1, 304.2, 304.5, 502, 258, 159, 49, 91, 134, 154, 268, 266; 474/238, 253–258; 152/531; 264/36, 1.5

[56] References Cited

U.S. PATENT DOCUMENTS

| | | | |
|---|---|---|---|
| 2,596,513 | 5/1952 | Tocci-Guilbert | 156/159 |
| 3,487,871 | 1/1970 | Kanamori | 156/307.7 |
| 3,558,930 | 1/1971 | Habegger | 156/137 |
| 3,605,201 | 9/1971 | Peterson | 474/256 |
| 4,021,291 | 5/1977 | Joice | 156/513 |
| 4,038,879 | 8/1977 | Courtney | 474/254 |
| 4,224,971 | 9/1980 | Müller | 156/91 |

Primary Examiner—Donald E. Czaja
Assistant Examiner—Merrell C. Cashion, Jr.
Attorney, Agent, or Firm—Oblon, Fisher, Spivak, McClelland & Maier

[57] ABSTRACT

There is provided a method for splicing of elastomeric belts having one or more reinforcing members extending in the lengthwise direction of the belt. The method includes the steps of recessing the reinforcing members at the open belt ends and subsequently butt-joining the belt ends to form an endless belt.

9 Claims, 18 Drawing Figures

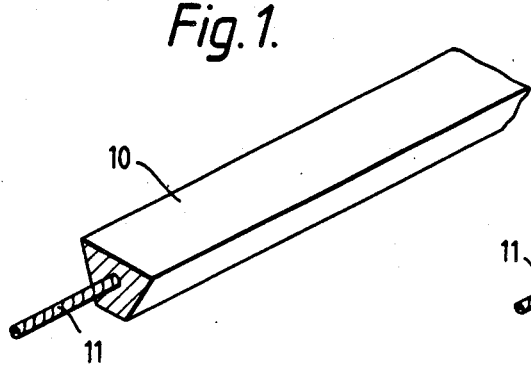
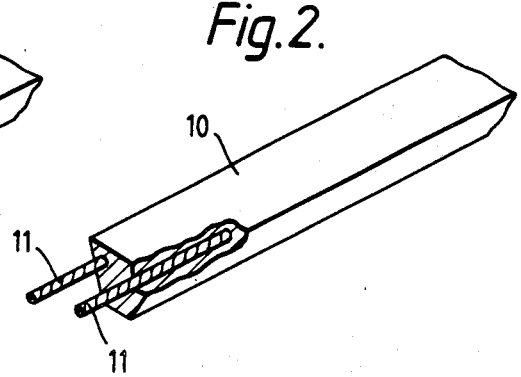
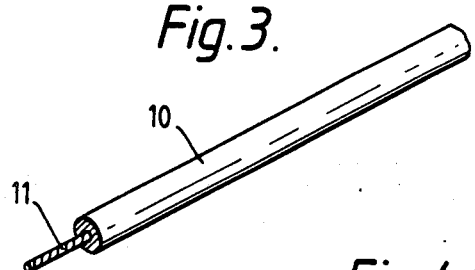
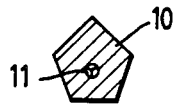
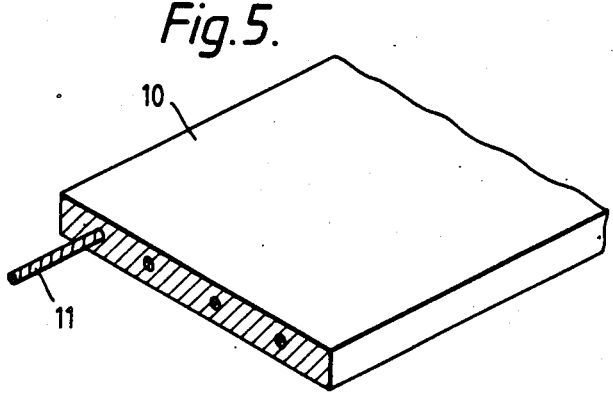
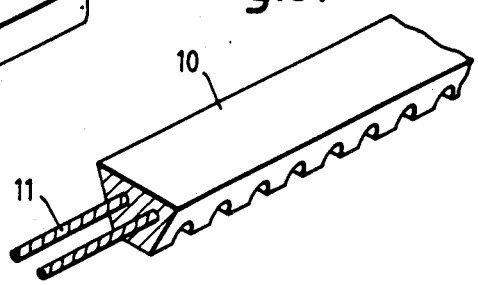

METHOD FOR SPLICING OF ELASTOMERIC BELTS

FIELD OF THE INVENTION

The present invention relates to a method for rapid splicing of open-end, reinforced elastomeric belting into an endless belt, and the belts thus produced.

BACKGROUND OF THE INVENTION

There are known various types of open-end belting which can be spliced, utilizing different means, requiring tooling of varying degrees of sophistication and complexity, and yielding a range of properties of the finished belt.

Thus, elastic belts have been utilized, comprised of various sections made of thermoplastic elastomers and spliced by butt-welding the two open ends together. Such belts are seriously restricted in their pull-foce capabilities and exhibit undesirable creep and stretch. Also, similar belts were proposed with a hollow construction allowing the use of mechanical fasteners and inserts for belt splicing. Thus German Pat. No. P2152215.6 (Woodward) describes a metallic shank to be inserted into both ends of hollow belt for production of an emergency belt. Such joining means are highly unreliable, as the elastomeric material cannot adequately resist shank pull-out. Also, the hollow construction of the elastomeric belt further reduces its resistance to creep and stretch. Additionally, the shank introduces a very stiff section to the belt. In order to alleviate these drawbacks, belts have been proposed where tensile members are embedded within the body element of the belt. Such tensile members could be woven tape of synthetic fibers as in U.S. Pat. No. 4,366,014 (Pollard), or metallic cables as in U.S. Pat. No. 4,283,184 (Berg). In both cases, the body element comprises a thermoplastic elastomer such as polyurethane.

Major attempts were made to provide continuity in the pull capability of the belt in the splice area. Thus in the Berg patent a metallic bushing crimped on both ends of the steel cables is used for splicing. Durability of this type is very limited, however, due to concentration of stresses at the bushing ends.

The Pollard act suggests welding of both belting ends in such a way that the reinforcing tape of both belt ends overlap. This results in a stiff section that shortens belt life and also requires quite elaborate preparation and tooling.

While the method of butt-welding plastic belts appears to be most desirable due to simplicity, quickness and appearance of splice, it was not possible, in the past, to extend the method to longitudinally reinforced belting. Such belting, when butt-welded, breaks at the weld upon flexing due to concentration of stresses at the weld area, as the sections on either side of the weld are stiffer than the weld section. A method circumventing this drawback could provide belts for both power transmission and conveying applications for longer life ratings not possible with nonreinforced plastic belts.

OBJECTS OF THE INVENTION

It is thus an object of this invention to provide a method for splicing reinforced plastic belting in a quick and simple manner.

It is a further object of this invention to provide simple hand tools for carrying out such splicing.

It is yet a further object of this invention to avoid a stiff section at the splice zone.

A further object is to provide a smooth, uniform, and totally covered splice zone.

A further object of this invention is to provide a method for production of an endless belt with much improved pull-force capability and resistance to stretch and creep as compared to non-reinforced plastic belts.

SUMMARY OF THE INVENTION

These objects the present invention achieves by providing a method for splicing of elastomeric belts having one or more reinforcing members extending in the longitudinal direction of said belts, comprising the steps of recessing said reinforcing members at the open belt ends and subsequently butt-joining said belt ends to form an endless belt.

The method for splicing belting into endless belts described hereinbelow is applicable to a wide variety of belting constructions, geometries and end uses. Thus belting intended for conveying as well as power transmission applications can be obtained utilizing this method.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective view of a typical plastic V-belt, single-cord reinforced, that can be spliced by the method of this invention;

FIG. 2 is a perspective view of a typical plastic V-belt, reinforced by two cords and spliceable by the method of this invention;

FIG. 3 is a perspective view of a round belt axially reinforced;

Figure 7:
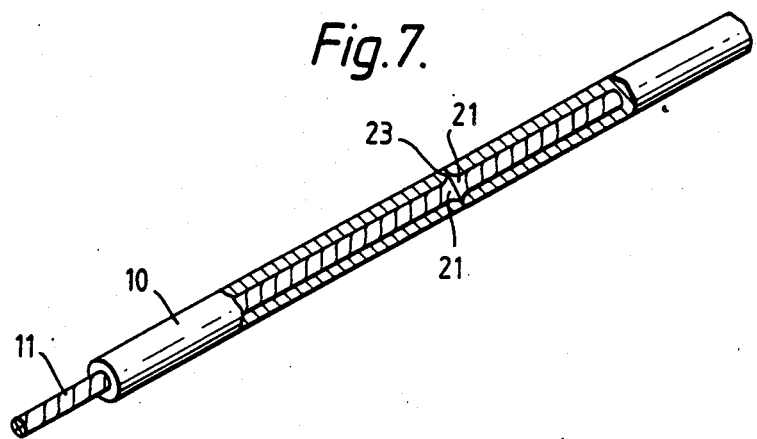
Figure 8:
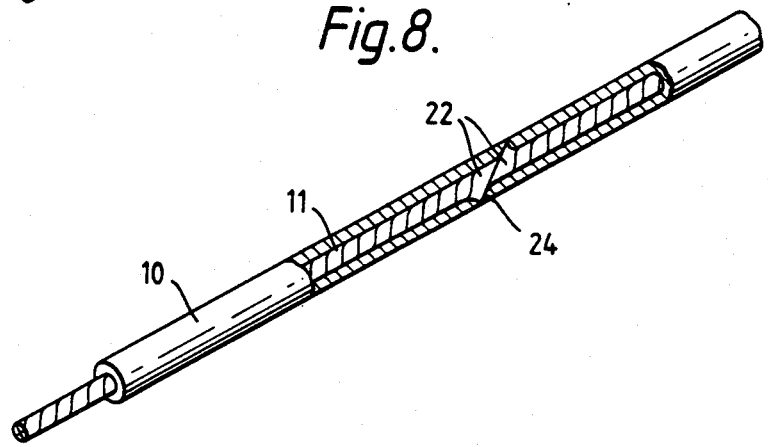
Figure 9:
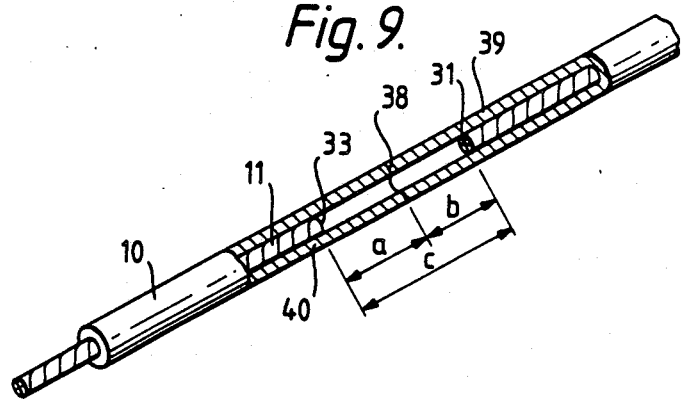
Figure 10:
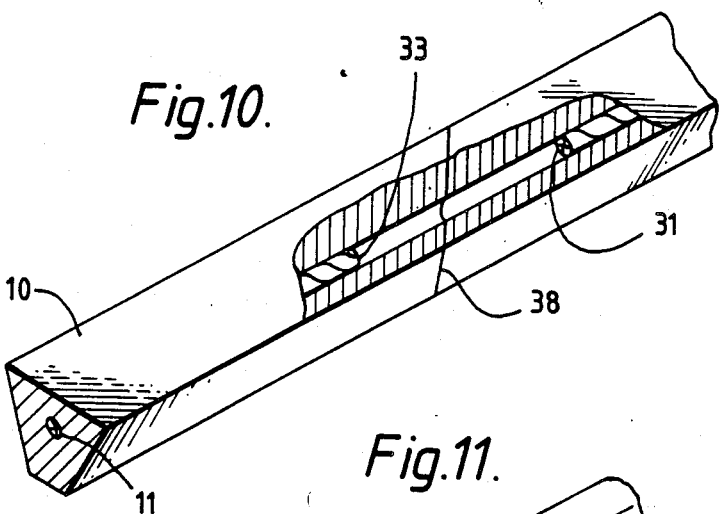
Figure 11:
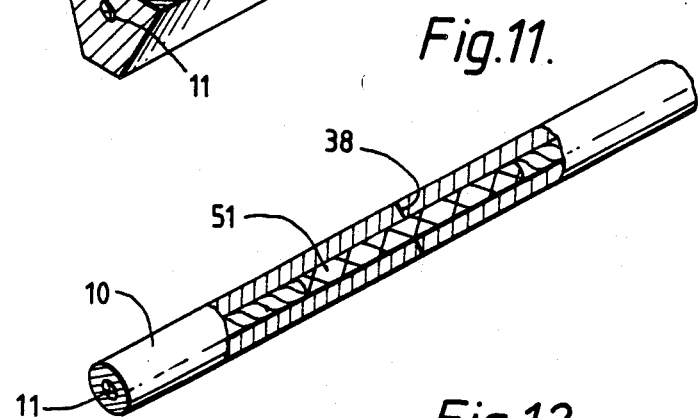
Figure 12:
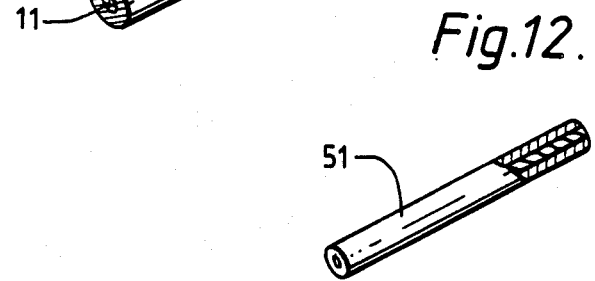
Figure 13:
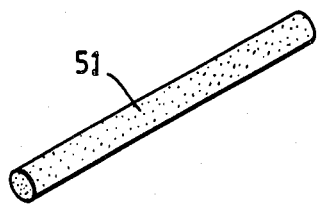
Figure 14:
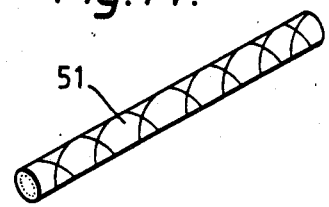
Figure 15:
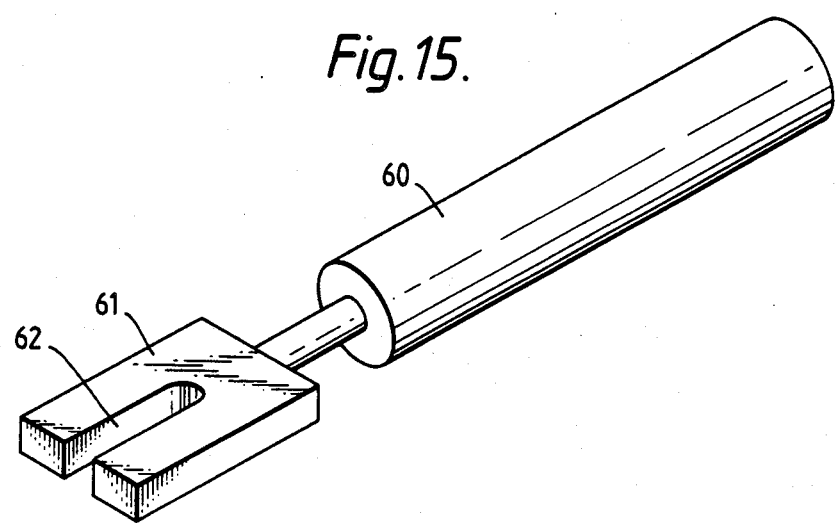
Figure 16:
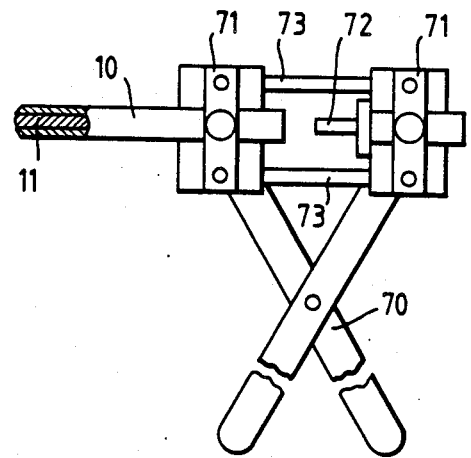

FIGS. 4a, b, c show examples of cross sections of cord-reinforced plastic belting that can be spliced by the method of this invention;

FIG. 5 is a perspective view of a flat belt with parallel longitudinal multi-cord reinforcements;

FIG. 6 is a perspective view of a cogged, plastic V-belt with double-cord reinforcement;

FIG. 7 is a partial section of a cord reinforced plastic belt butt-joined at 90° without cord recessing;

FIG. 8 is similar to FIG. 7, but with a slanted butt joint;

FIG. 9 is a partial section of a belt spliced at 90° by the cord recess method of this invention;

FIG. 10 is similar to FIG. 9, but with a slanted butt joint;

FIG. 11 is a partial section of a belt spliced by the method of cord recessing with the addition of an insert;

FIG. 12 is a perspective view of a single-cord reinforced insert;

FIG. 13 is a perspective view of a chopped-fiber reinforced insert;

FIG. 14 is a perspective view of a braid-reinforced insert;

FIG. 15 is a perspective view of a welding iron for butt welding with an arrangement for an insert, and FIG. 16 is a plane view of a pair of welding pliers with a detatchable pin for reinforcement recessing.

DETAILED DESCRIPTION OF THE PRESENTLY PREFERRED EMBODIMENTS

Referring now to the drawings, there are seen in FIGS. 1 to 6 some of the belts used in industry for both power transmission and conveying applications than can be spliced by the method according to the invention.

The body element 10 may consist of any elastomeric compound, of which typical ones are copolymers such as polyurethane, copolyesters, polyblends such as mechanical blends of EPDM and polypropylene and many known rubbers. The matrix properties need to meet the demands on the belt as to hardness, stiffness, coefficient of friction, and chemical and environmental resistance. For example, a soft polyurethane of hardness of 75 to 100 Shore-A may be used in round belts in tile conveying lines, while harder grades ranging from 50 to 72 Shore-D may be needed for power transmission in a V-belt.

Reforcing members 11 are fully embedded in the belt body longitudinally and usually consist of twisted or braided cords of synthetic fibers such as polyester, aramids or others.

Another common arrangement utilizes steel cords. For good adhesion of cords to matrix, various adhesives and surface treatments may be applied to the cord prior to the process of embedding in the matrix. Configurations may vary from a single to multiple cord arrangement located in various positions within the belt section.

The reinforcing member 11 is intended for carrying the tension loads of the belt in operation at low elongations. The body matrix forms the external contour to fit the pulleys and sheaves, provides the desired contact with conveyed products, and protects the cord from abrasion and environmental exposure. It also transmits the power from the drive pulley to the belt reinforcement and from the reinforcement to the driven pulleys or conveyed products. An additional important function of the belt body is to transmit forces through the splice zone. Attempts at simply butt welding the belt ends are shown in FIGS. 7 and 8 at different angles. As can be seen in the drawings, the cord ends 21 and 22, pushed against each other, flare out and tend to reduce the effective joint area 23 and 24, thus reducing the pull force capability of the belt in the splice zone. A further detriment of such a splicing method is that the belt sections, on both sides of the splice are stiffer than the splice section and therefore stresses are concentrated in tension and under flexing in the splice itself and dramatically shorten its life.

The process of producing an endless belt according to the present invention starts with first cutting the belting to the required length. The reinforcing cords are then recessed at one or preferably both ends of the belt as shown in FIGS. 9 and 10 to the appropriate depths a and b. This can be effected by pushing the cords into the belting with the aid of a tool shown in FIG. 16 and explained further below, or using heated pins to push in and crumble the cord ends so as to better anchor them in the belt. Alternatively, recessing may be effected by drilling out the cord ends to the required depth. In whatever way this is done, new positions of ends 31 and 33 are formed thus defining the length of the splice zone c as the distance between opposing ends of cords along the splice, that is $c = a + b$.

The belt ends are then butt-joined together to form an endless belt. The method of butt joining may be selected to best suit the body material properties and availability of tooling. Thus for thermoplastic materials, fusion may be produced by such means as having both ends contact a hot plate, with the aid of a jet of hot air, the use of ultrasonic welding, spin welding or any welding technology known to the art. It is also possible to fuse into the splice area a meltable electrode as is common in connecting ends of flat belting of thermoplastic body.

Another alternative for butt-joining is the use of adhesives, a method that is not restricted to thermoplastic materials and can include vulcanized rubber, cross-linked polyurethane and others.

An endless belt is thus formed, in which longitudinal reinforcements are present throughout its length with the exception of the splice zone. The splice zone thus formed introduces a flexible section whose length can be predetermined, separating two sides of a stiffer construction. The resultant stresses developed upon flexing and tensioning will be much better distributed and reduced as compared to butt weld without recessed cords. Additionally, with cords recessed on both sides of the joint face 38, the peak values of stress obtained at the cord ends 31 and 33 will not be concentrated at the joint face 38, but rather at points along the homogenuous belt body matrix 39 and 40. Also, due to the cords being recessed, an uninterrupted and full cross section is obtained at the welding area for maximum strength. Obviously attention must be paid not to unnecessarily increase the length of the splice zone c, as this contributes to an undesirable increase in belt stretch under tension. The parameters determining the adequate length or the splice zone will be explained hereunder.

The desirable length of the splice zone is determined by the relative flexural stiffness of the reinforced section and the non-reinforced splice zone. Further factors determining the stresses to be expected in the belt are its eventual operating conditions such as flexing radii and tension loads.

The following specific examples will offer an understanding of the wide applicability of the method to diverse operating conditions of belts and intended end uses, and should not be construed as an exhaustive or limiting list of possibilities covered by this invention.

To first demonstrate a case of very moderate conditions, a conveyor belt is chosen of a round cross section of 8 mm in diameter, made of thermoplastic polyurethane of Shore-A hardness 80 and reinforced with a twisted polyester cord of 15,000 denier along its center axis and intended for light use on pulleys of over 100 mm in diameter. As the stresses exerted in this case are rather low and the extremely elastic nature of the belt body material can easily tolerate the flexing extensions, only very shallow recesses will be required. A recess on either end of only 2 mm will suffice in this case, and the recess has the main function of ensuring a full cross section at the joint. The belt ends are welded with the aid of a hot iron such as that shown in FIG. 15 and explained further below. This belt is obviously quite limited in its capability to withstand tension loads due to the weak consistency of the belt body in the splice zone. Yet a belt thus spliced can transmit substantially higher loads than a similar belt without reinforcement, as the total stretch and creep are significantly reduced.

When higher tension loads have to be handled, such as in the case of a power-transmission V-belt, the obvious approach is to incorporate a higher modulus and strength in both the reinforcing members and the body material. Thus for a V-belt of classical size B intended for use over pulleys of 110 mm and operating at 25 m/sec while transmitting 2.2 kW, a cogged V-section may be chosen, made of 67 Shore-D hardness polyester elastomer reinforced by two polyester cords of 55,000 denier each, longitudinally located in a horizontal plane as shown in FIG. 6. In such a case, a regular butt-welded joint without cord recessing would result in the joint snapping upon flexing. It was found that such a design and operating conditions demand a minimum cord recess of 4 mm on either side. A belt with 10 mm recess on each side was found to perform satisfactorily both with respect to power transmission capability and belt life.

In a different embodiment of this invention, inserts 51 may be introduced into the cavities formed by the cord recess, as schematically illustrated in FIG. 11, prior to butt joining the two belt ends. Different forms of such inserts are shown in FIGS. 12 to 14. In general, the insert 51 is of a construction that exhibits higher stiffness than the belt body material of equivalent diameter. The insert reduces stress concentration at the joint and shifts the points of peak stress towards the cord ends. Stress distribution is affected by selection of the insert according to its stiffness and length.

Stiffer inserts may be provided by use of stiffer elastomers or other material, by reinforcing an elastomeric shank with longitudinal cords as in FIG. 12 or with chopped fibers as in FIG. 13, or using a braided elastomer as in FIG. 14. The external surface of the insert can either be smooth or it may be fluted or ribbed for better mechanical grip in the belt body. In another configuration, the inserts may be made of a semi-rigid or even rigid material, having a number of circumferential ridges of a sawtooth-like cross section oriented in such a way as to facilitate introduction into the recessed belt ends, while offering considerable resistance to extraction therefrom.

FIG. 15 shows a simple butt-welding tool, consisting of a thermally insulated handle 60 and a heatable plate 61 in which there is provided a slot 62 for the insert to pass through. When the belt ends, presses from both sides against the hot plate 61, begin to fuse, the tool is rapidly withdrawn and the ends are pushed one against the other, producing the joint.

Another tool for carrying out the method according to the invention is illustrated in FIG. 16. This is a pair of pliers comprising handles 70, clamping jaws 71 to rigidly hold the belt ends, and a recessing pin 72 which can be gripped in one of the jaws 71 and which is used to push back the reinforcing member 11 first in one belt end, then in the other. This having been accomplished, the pin 72 is removed, and the second belt end is mounted in its place. The insert 51 (if an insert is used) is introduced into both belt ends, and a welding tool (e.g., such as shown in FIG. 15) is applied. At the proper moment the butt-welding tool is withdrawn and, by operating the handles 70, the jaws 71 and, thereby, the fixedly held belt ends, are forced one against the other, producing the joint. Guide bars 73 keep the jaws 71 and, thus, the clamped belt ends, in alignment, even in the absence of an insert 51 which has a certain aligning effect, at least for round belts.

It would also be possible to make the heatable butt-welding plate an integral part of the pliers.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method of splicing the ends of elastomeric belts having one or more reinforcing members embedded therein and extending in the longitudinal direction thereof, said method comprising the steps of:
    (a) providing one or more cavities in said ends where said one or more reinforcing members were formerly located and
    (b) subsequently butt-joining said ends, thereby splicing said ends together to form a continuous belt.

2. A method as recited in claim 1 wherein the step of providing said one or more cavities is effected by pushing a pin at least substantially aligned with each one of said one or more reinforcing members into said ends.

3. A method as recited in claim 2 wherein said pin is heated.

4. A method as recited in claim 1 wherein the step of providing said one or more cavities is effected by drilling.

5. A method as recited in claim 1 wherein said reinforcing members are selected from the group consisting of cords and woven tape of relatively high tensile strength.

6. A method as recited in claim 1 and comprising the further step of introducing an insert into each one of said one or more cavities in said ends prior to butt-joining said ends.

7. A method as recited in claim 1 wherein the step of butt-joining said ends is effected by heat fusion.

8. A method as recited in claim 1 wherein the step of butt-joinng said ends is effected by application of adhesive.

9. A method as recited in claim 1 wherein the continuous belt formed by the step of butt-joining said ends is an endless belt.

* * * * *